(12) United States Patent
Grosser et al.

(10) Patent No.: US 7,724,734 B1
(45) Date of Patent: May 25, 2010

(54) METHODS, SYSTEMS, AND COMPUTER PROGRAM PRODUCTS FOR CONTROLLING UPDATING OF A LAYER 3 HOST TABLE BASED ON PACKET FORWARDING LOOKUP MISS COUNTS

(75) Inventors: Donald B. Grosser, Apex, NC (US); Edward J. Rovner, Chapel Hill, NC (US); Olen L. Stokes, Cary, NC (US)

(73) Assignee: Extreme Networks, Inc., Santa Clara, CA (US)

( * ) Notice: Subject to any disclaimer, the term of this patent is extended or adjusted under 35 U.S.C. 154(b) by 890 days.

(21) Appl. No.: 11/317,665

(22) Filed: Dec. 23, 2005

(51) Int. Cl.
*H04L 12/56* (2006.01)

(52) U.S. Cl. ...................................... 370/389

(58) Field of Classification Search ................ 370/237, 370/351, 355, 356, 389, 392, 395.31, 395.32, 370/397, 409; 709/238–242
See application file for complete search history.

(56) References Cited

U.S. PATENT DOCUMENTS 6,470,425 B1 * 10/2002 Yamashiroya ............... 711/133

OTHER PUBLICATIONS

Huan Liu, "Routing Prefix Caching in Network Processor Design", IEEE proceedings, Computer Communications Networks, Oct. 15-17, 2001, pp. 18-23.*

Liu, "Routing Prefix Caching in Network Processor Design," Department of Electrical Engineering at Stanford University in California, IEEE proceedings, Oct. 15-17, 2001, pp. 18-23.

* cited by examiner

*Primary Examiner*—Gregory B Sefcheck
*Assistant Examiner*—Yong Zhou
(74) *Attorney, Agent, or Firm*—Jenkins, Wilson, Taylor & Hunt, P.A.

(57) ABSTRACT

Methods, systems, and computer program products for controlling updating of a layer 3 host table based on packet forwarding miss counts are disclosed. According to one method, layer 3 packets are routed using at least one of a layer 3 host table containing entries corresponding to remote hosts and a longest prefix matching table containing prefixes corresponding to remote hosts. For each layer 3 destination address for which a lookup in at least one table fails, a number of packets received within a time period are counted. Remote destination entries in the host table are replaced based on the counts.

22 Claims, 4 Drawing Sheets

METHODS, SYSTEMS, AND COMPUTER PROGRAM PRODUCTS FOR CONTROLLING UPDATING OF A LAYER 3 HOST TABLE BASED ON PACKET FORWARDING LOOKUP MISS COUNTS

TECHNICAL FIELD

The subject matter described herein relates to controlling updating of a layer 3 packet forwarding host table. More particularly, the subject matter described herein relates to methods, systems, and computer program products for controlling updating of a layer 3 packet forwarding host table based on packet forwarding lookup miss counts.

BACKGROUND ART

Packet forwarding devices, such as layer 3 or IP routers, typically use one or more tables to store packet forwarding information. For example, layer 3 packet forwarding devices may include a hardware-implemented layer 3 host table that typically stores entries corresponding to hosts that are directly connected to the packet forwarding device. Each entry may include an IP address of a locally connected host and corresponding forwarding information for the locally connected host. When a packet arrives at the packet forwarding device, a lookup may be performed in the layer 3 host table based on the destination IP address in the packet. If a matching entry is located, the corresponding packet forwarding information is extracted from the layer 3 host table and used to forward the packet to the destination host. If an entry is not located, a miss occurs, and a slower lookup is performed using software.

Another type of table that may be maintained in a layer 3 packet forwarding device is a longest prefix matching (LPM) table. Each entry in a longest prefix matching table may include a subnet address and a subnet mask to be applied to destination IP addresses of incoming packets. When a packet is received, the subnet mask for each entry in the LPM table is applied to the destination IP address of the packet, and the masked address searched in the table. The entry with the longest prefix that matches the masked address in the received packet is used to extract next hop address information for the packet. Using an LPM table allows remote hosts to be identified by next hops without requiring entries in the LPM table for each individual remote host.

One problem with conventional packet forwarding devices is that space for the LPM and host tables is limited. For example, both tables are typically implemented in hardware to increase the number of hosts covered by hardware forwarding and therefore packet forwarding lookup speed. LPM tables are typically populated based on participation in routing protocols, such as routing information protocol (RIP), border gateway protocol (BGP) or open shortest path first (OSPF). When an LPM table becomes full, entries for remote hosts can be placed in the host table. However, the host table can also become full. When this occurs, packets received for destinations that are not present in the LPM or host tables must be forwarded using software, which results in longer lookup times.

In order to increase the routing efficiency of a layer 3 packet forwarding device, older entries in LPM and host tables may be replaced with newer entries. Conventionally, the replacement criteria for an entry include a least recently used (LRU) algorithm. That is, a host table entry that was used least recently may be replaced with a new entry for which a packet forwarding lookup fails. One problem with using an LRU algorithm to replace host table entries is that it is based on individual packets, which may result in excessive replacement of entries in the host table. For example, each time a miss occurs, an entry in the host table may be replaced. Such excessive replacement is undesired because replacing entries in the host table may be a processor intensive operation that requires a software copy of the host table be copied to hardware.

Another problem associated with using an LRU algorithm to replace entries in the host table is that such an algorithm does not take into account the volume of packets addressed to a destination. For example, an entry that was used 1000 times during a time interval more than one minute ago may be replaced by an entry that was used only once in the last minute. The high-volume entry may be more likely to be utilized in the future with a high volume than the low-volume entry. Thus, if the high-volume entry is replaced by the low-volume entry, multiple misses may occur before the high-volume entry can be re-added to the host table.

Accordingly, in light of these difficulties associated with conventional layer 3 packet forwarding devices, there exists a need for methods, systems, and computer program products for controlling updating of a layer 3 host table based on packet forwarding miss counts.

SUMMARY

According to one aspect, the subject matter described herein includes a method for controlling updating of a layer 3 host table based on packet forwarding lookup miss counts. The method includes routing layer 3 packets using at least one of a host table containing entries corresponding to local and remote hosts and a longest prefix matching (LPM) table containing remote host prefixes. For each layer 3 destination address for which a lookup in the host table and/or the LPM table fails, a number of packets received within a time period may be counted. Based on the counts, remote destination entries in the host table may be replaced. In one exemplary implementation, the remote destination entries in the host table may be replaced with remote destination entries whose miss counts are greater than or equal to those in the host table and whose miss counts meet or exceed a threshold during a measurement interval. It may be desirable to replace a remote destination entry in the host table only when the miss count for the destination being considered to replace the entry in the host table exceeds the miss count of the host table entry and the threshold, rather than when miss count is greater than or equal to the miss count for the host table entry and the threshold, to avoid thrashing.

The subject matter described herein for controlling updating of a layer 3 host table may be implemented in hardware, software, firmware, or any combination thereof. In one exemplary implementation, the subject matter described herein may be implemented using a computer program product comprising computer executable instructions embodied in a computer readable medium. Exemplary computer readable media suitable for implementing the subject matter described herein include disk memory devices, chip memory devices, programmable logic devices, and application specific integrated circuits. In addition, a computer program product that implements the subject matter described herein may be implemented on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
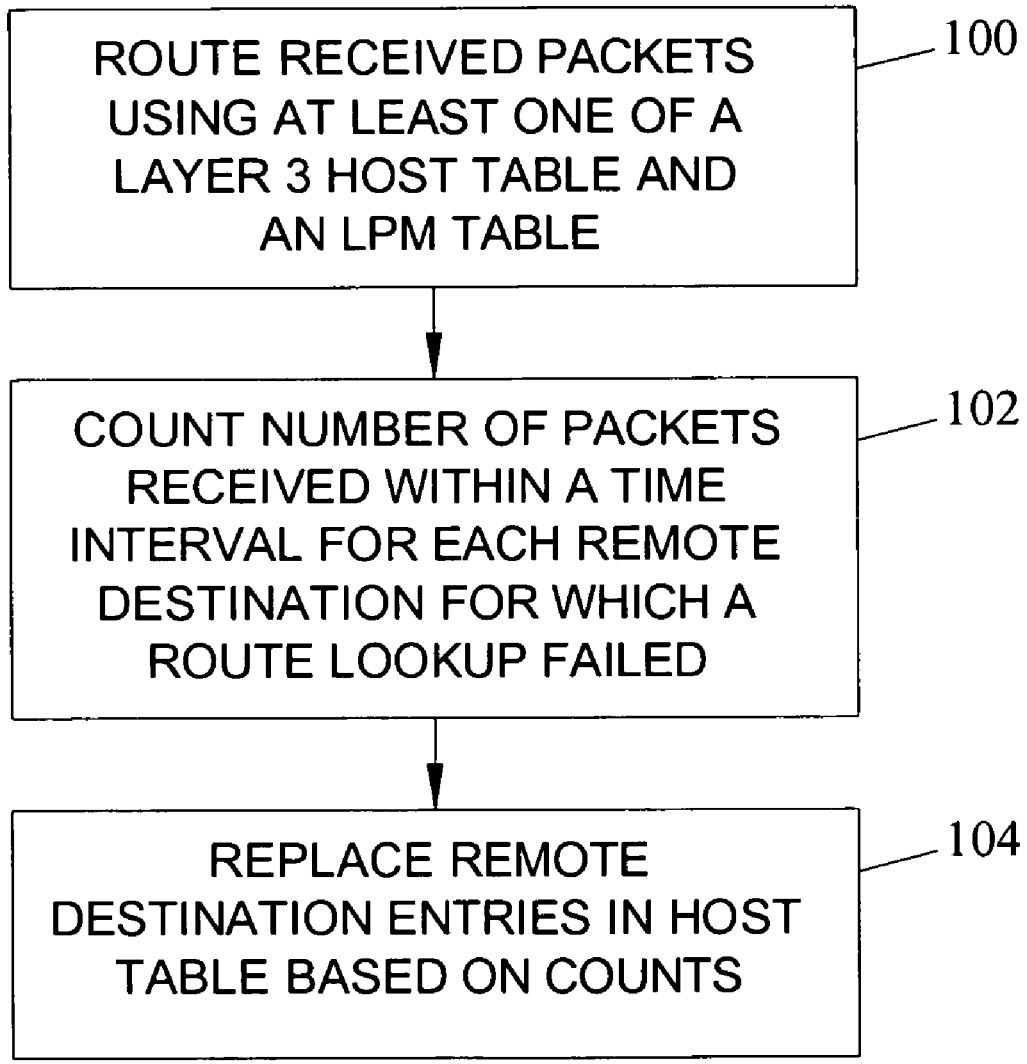
FIG. 1 is a flow chart illustrating an exemplary process for controlling updating of a layer 3 host table based on packet forwarding lookup miss counts according to an embodiment of the subject matter described herein.

FIG. 1 is a flow chart illustrating exemplary steps of a process for controlling updating of a layer 3 host table based on packet forwarding lookup miss counts according to an embodiment of the subject matter described herein. Referring to FIG. 1, in step 100, packets received at a layer 3 packet forwarding device are routed using at least one of a layer 3 host table and an LPM table. In one exemplary implementation, both a host table and an LPM table may be included, and lookups may first be performed in a host table, because the host table contains more specific information than the LPM table. If the lookup in the LPM table fails to result in a matching entry, a lookup may be performed in the LPM table. If the lookup in the host and LPM tables fails, a miss occurs, and the lookup must be performed in software. Exemplary hardware and software for performing layer 3 address lookups will be described in detail below. In an alternate implementation, a layer 3 forwarding device may include a host table with entries for remote hosts and may not include an LPM table. In such an implementation, when a lookup in the host table fails, a software lookup may be performed.

In step 102, for each destination for which a route lookup failed, the number of packets received within a time interval is counted. For example, if a lookup fails in both the host table and the LPM table or in the host table in a host-table-only implementation, the route lookup fails, and a lookup must be performed using software. The failure to route a packet in hardware is referred to herein as a miss. For each destination for which a miss occurs, a count is recorded. Counts may be maintained on a per destination basis. The number of hosts for which miss counts are maintained during a time interval may be limited to a maximum number to conserve memory and reduce search time. In step 104, remote destination entries in the host table are replaced based on the counts. Step 104 may be performed when the area in the host table for storing remote destination entries is full. When this occurs, it may be desirable to replace entries for destinations in the host table with lower counts than destinations that have not been written to the host table with higher miss counts. It may also be desirable to require that entries be replaced only if the remote destination entries that have not been added to the host table exceed a threshold miss count value to avoid excessive replacements. It may further be desirable to take into account the age of entries in the host table. An exemplary process for replacing entries based on counts will be described in more detail below.

Figure 2:
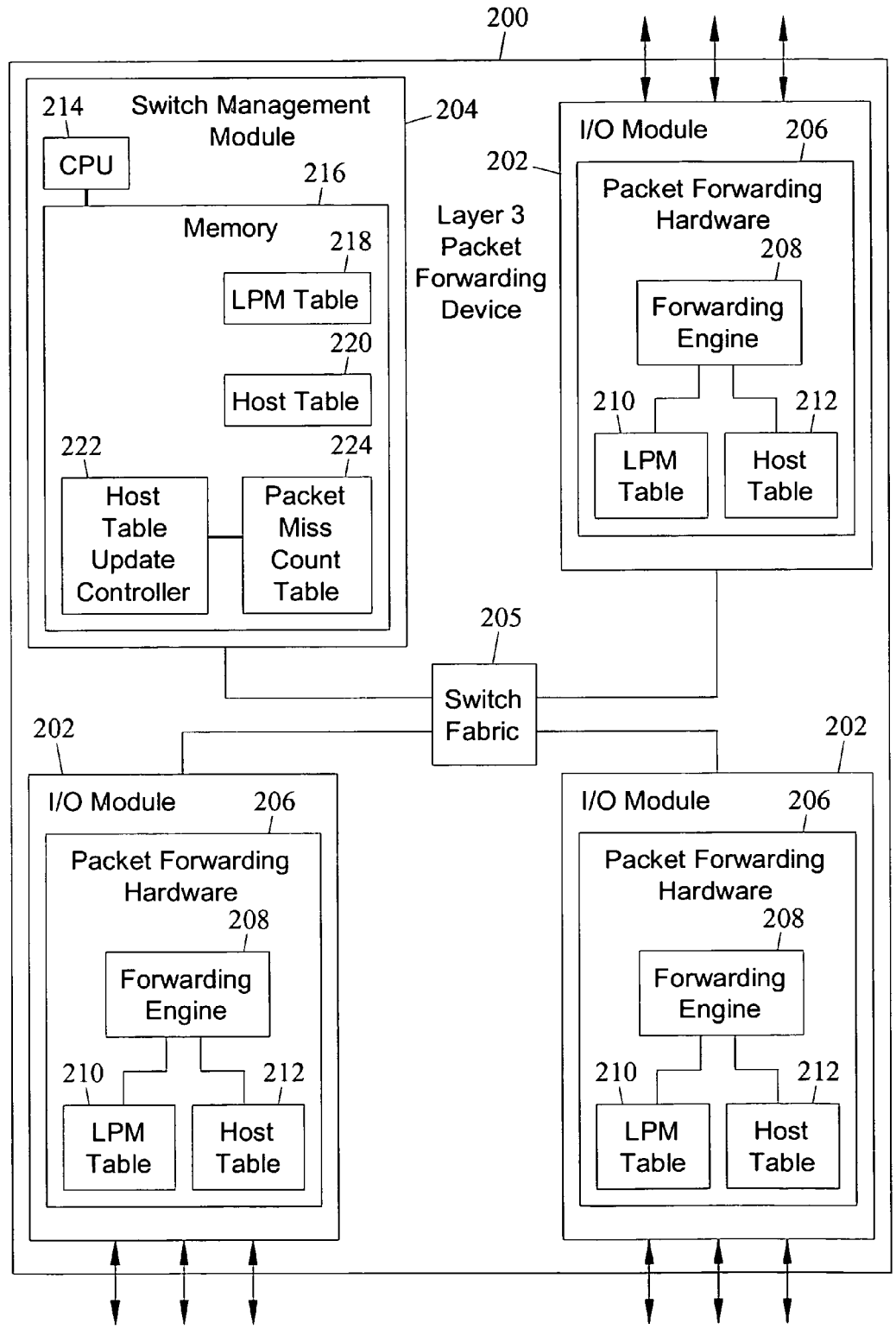
FIG. 2 is a block diagram of a layer 3 packet forwarding device that controls layer 3 host table updating based on packet forwarding lookup miss counts according to an embodiment of the subject matter described herein.

FIG. 2 is a block diagram illustrating exemplary components of a layer 3 packet forwarding device including a system for controlling updating of a layer 3 host table according to an embodiment of the subject matter described herein. Referring to FIG. 2, packet forwarding device 200 includes a plurality of input/output (I/O) modules 202, a switch management module 204, and a switch fabric 205. I/O modules 202 each include packet forwarding hardware 206. Packet forwarding hardware 206 includes a forwarding engine 208, a longest prefix matching (LPM) table 210, and a host table 212. In the illustrated example, packet forwarding engine 208 performs lookups in host table 212 and LPM table 210 to route packets. LPM table 210 may be any suitable table that includes remote host prefixes and corresponding next hop addresses. In an alternate example, LPM table 210 may be omitted, and packet forwarding device 200 may perform lookups in host table 212.

An example of an entry in LPM table 210 is as follows:

TABLE 1

Exemplary LPM Table Entry

| Subnet/Length | Gateway IP Address | VLAN | Port |
|---|---|---|---|
| 128.160.0.0/16 | 194.162.1.1 | 3 | 1 |

In the LPM table entry illustrated above, the first column contains the subnet and mask length to be applied to incoming packets. The second column includes the IP address of a gateway connected to the remote subnet. The next column includes a VLAN tag to be applied to packets sent to the subnet. The final column specifies a port in the packet forwarding device to which the layer 3 packet should be forwarded. It should be noted that the gateway IP address may be used to locate a layer 2 address corresponding to the gateway. In addition, it should also be noted that the structure for the LPM table entry illustrated in Table 1 is merely an example of information that may be used to forward a packet. Fields may be added, deleted, or replaced without departing from the scope of the subject matter described herein. In addition, the fields in Table 1 may be distributed across multiple tables without departing from the scope of the subject matter described herein.

Table 2 shown below illustrates an example of an exemplary layer 3 host table entry.

TABLE 2

Exemplary Layer 3 Host Table Entry

| Host IP Address | Locally Attached? | Multicast? | VLAN | MAC Table Index | Packet Count | Birth |
| --- | --- | --- | --- | --- | --- | --- |
| 128.156.0.1 | N | N | 3 | MAC 5 | 100 | Nov. 29, 2005, 09:00 |

In the exemplary layer 3 host table entry, the first column stores a 32 bit destination host IP address. For IP version 6, the width of the first column or field may be extended to handle bit lengths corresponding to IPv6 addresses. The next column indicates whether the host is locally attached or not. The next column indicates whether the address is a multicast address or not. In the illustrated example, the host is not locally attached and the address is not a multicast address. The next column specifies the VLAN tag to be added to packets sent to the remote host. The next column stores an index to a MAC table which stores the MAC address of the gateway through which the remote host is reachable.

The next two columns in the host table store information that is useful in controlling updating of the host table. For example, the packet count field stores a count of 100, and the birth field indicates that the entry was added at 09:00 on Nov. 29, 2005. In one exemplary implementation, the packet count field may indicate the number of misses that occurred for the destination IP address in the first field of the entry during a predetermined measurement period before the entry was added to the table. For example, a packet count of 100 may indicate that 100 misses occurred during the measurement interval. In an alternate implementation, the packet count field may contain a packet count that indicates the number of times the entry has been used within a moving time interval. For example, the packet count filed may indicate that the entry was used 100 times within the last minute. The birth field indicates the time that the entry was added to the host table and may be used along with the packet count to determine whether to replace the entry. As with Table 1, fields in the host table may be replaced, deleted, or distributed across multiple tables without departing from the scope of the subject matter described herein.

Switch management module 204 includes a central processing unit 214 and a memory 216. CPU 214 controls the overall operation of layer 3 packet forwarding device 200. In addition, CPU 214 controls updating of LPM table 210 and host table 212 maintained by each I/O module.

In the illustrated example, memory 216 stores an LPM table 218 and a host table 220. LPM table 218 may include a copy of LPM table 210 maintained in hardware plus any additional entries that have been learned and not populated to hardware. Similarly, host table 220 may include a copy of host table 212 maintained in hardware plus any additional entries that have been learned and not populated to hardware. In order to construct LPM table 218, CPU 214 may execute routing protocol software, such as BGP, OSPF or RIP software.

In order to update host table 220, CPU 214 may execute software, referred to herein as host table update controller 222. Host table update controller 222 maintains a count of packet forwarding lookup misses that are required to be looked up by CPU 214 in LPM table 218 and host table 220. As described above, tables 218 and 220 may include entries that have been learned but that have not been populated to hardware. When a miss occurs using packet forwarding hardware 206 on one of the I/O modules 202, the packet may be forwarded to switch management module 204 for forwarding. Switch management module 204 performs a lookup in LPM table 218 and host table 220 and forwards the packet. Host table update controller 222 maintains a packet miss count table 214 to track the number of packets for which packet forwarding hardware lookups resulted in a miss. Host table update controller 222 may control updating of entries and host table 212 based on the miss counts.

Figure 3A:
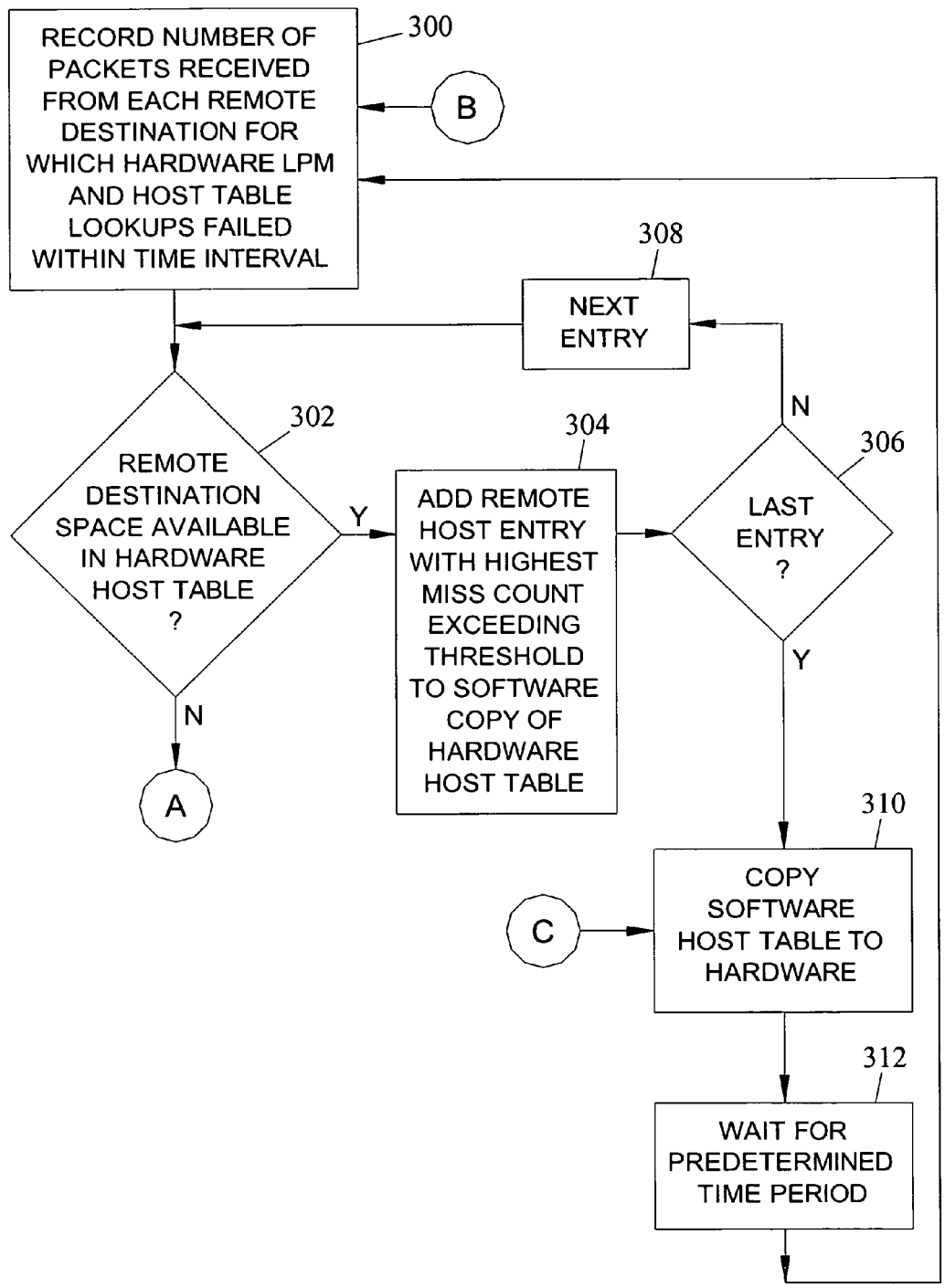
FIGS. 3A and 3B are a flow chart illustrating an exemplary process for controlling updating of a layer 3 packet forwarding host table according to an embodiment of the subject matter described herein.
Figure 3B:
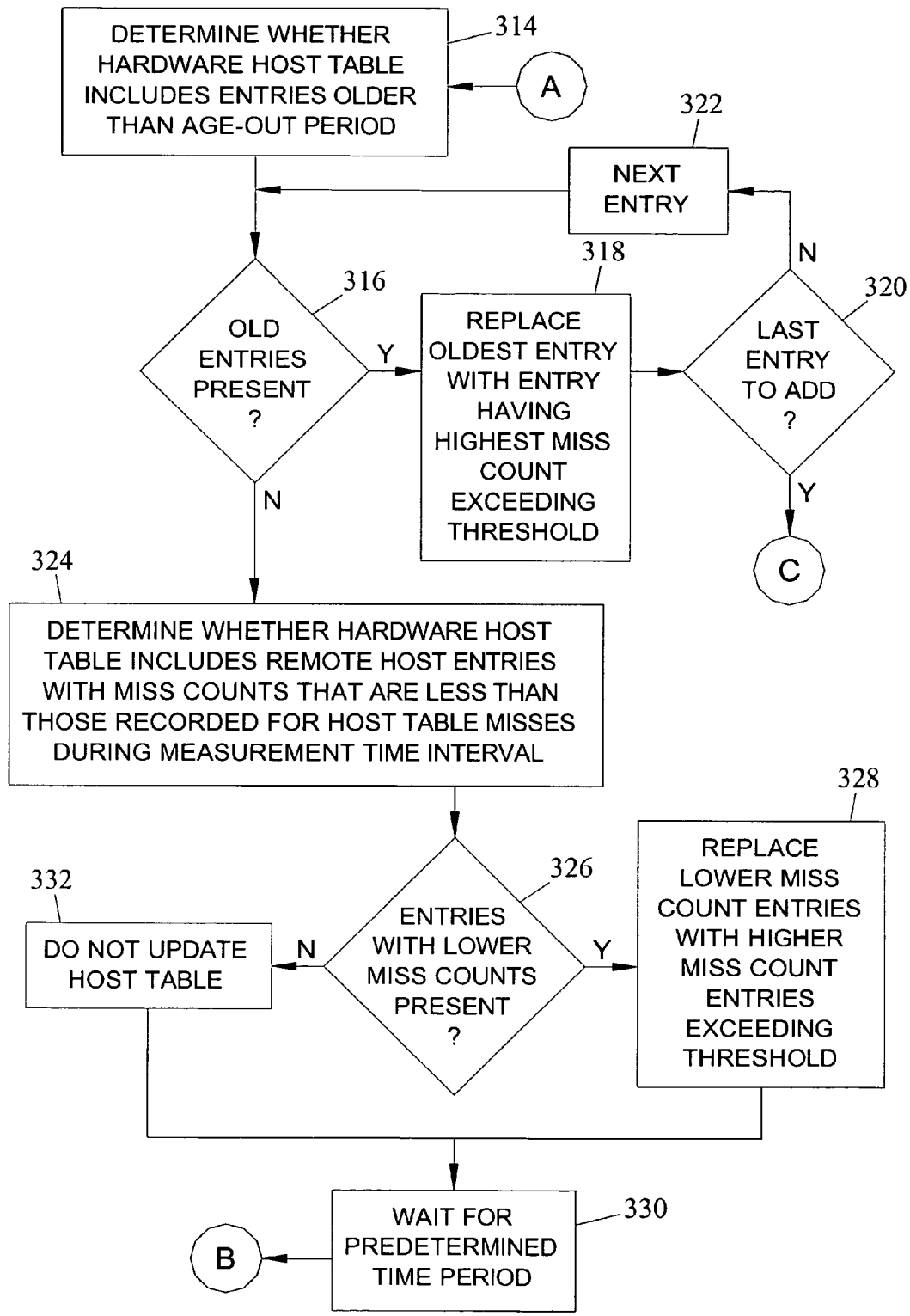

FIGS. 3A and 3B are a flow chart illustrating exemplary steps that may be implemented by layer 3 packet forwarding device 200 illustrated in FIG. 2 in controlling updating of host table entries based on packet forwarding lookup miss counts according to an embodiment of the subject matter described herein. Referring to FIG. 3A, in step 300 host table update controller 222 records a number of packets received for each remote destination for which a hardware host and LPM table lookup failed within a time interval. In an implementation with a host table only, step 300 would include counting host table misses. In one implementation, misses for each destination may be counted during one second time intervals that are spaced apart by ten seconds. One reason for spacing the miss count recording intervals is that counting the number of packets for each destination may be processor intensive and CPU 214 may need to be free to perform other tasks. For each received packet for which a miss occurs, host table update controller 222 determines whether an entry exists for the destination of the packet in packet miss count table 224. If an entry exists, host table update controller may increment the miss count for the entry. If an entry does not exist, host table update controller 222 may create an entry in packet miss count table 224 for the destination and set the packet miss count to one.

Once the time interval has expired, control proceeds to step 302 where it is determined whether remote destination space is available in the hardware host table. For example, hardware host tables 212 may have a certain number of space allocated for remote host entries. Host table update controller 222 may be configured to know and keep track of the amount of space in host tables 212. Entries for locally connected hosts and multicast routes are preferably given priority over entries for remote hosts. Accordingly, in step 302, if space is available for a remote host in a hardware host table, control proceeds to step 304 where the remote host entry with the highest count exceeding an operator defined miss count threshold is added to software host table 220. Defining a miss count threshold prevents packets with a small number of misses from triggering a host table update. Once the entry is added, it is then determined whether this was the last entry present in the miss count table (step 306). If this was not the last entry, control proceeds to step 308 where the next entry in the packet miss count table is examined. Steps 302-308 are repeated until all of the entries from the miss count table whose miss counts exceed the threshold have been added to the software copy of the host table or when the remote destination space in the host table becomes full.

Returning to step 306, if the last entry from the packet miss count table has been added to the software copy of the host table and the host table is not full, control proceeds to step 308 where the software copy of the host table is copied to hardware. In step 312, host table update controller 222 waits for the next recording interval and returns to step 300 to begin recording miss counts.

Returning to step 302, if remote destination space is not available in the hardware host table, control proceeds to step 314 illustrated in FIG. 3B. In step 314, host table update controller 222 determines whether the hardware host table contains entries that are older than the age-out period. In one exemplary implementation, the age-out period may be set to ten minutes. The age-out period may be measured from the time when an entry is added to the host table. In step 316, if old entries, i.e., entries older than the age-out period, are present in the host table, control proceeds to step 318 where the oldest entry in the host table is replaced with the entry in the packet miss count table having the highest miss count exceeding the miss count threshold. In step 320, it is determined whether the current entry in the packet miss count table is the last entry to add. For example, as discussed above, it may only be desirable to add entries that have at least a threshold number of miss counts. The number of entries that are to be replaced may be determined based on the number of destinations having miss counts that meet or exceed the threshold. If it is determined that the current entry is not the last entry to add, control proceeds to step 322 where the next entry in the packet miss count table is examined. Steps 316-322 are repeated until all of the old entries in the host table have been replaced by entries whose miss counts meet or exceed the miss count threshold.

Returning to step 320, if it is determined that all entries have been added to the host table, control proceeds to steps 310 in FIG. 3A where the software copy of the host table is copied to hardware. In step 312, host table update controller 222 waits for a predetermined time interval and re-starts the counting of host table lookup misses.

Returning to step 316, if it is determined that old entries are not present, control proceeds to step 324 where it is determined whether the hardware host table includes remote host entries with packet miss counts less than those recorded for host table misses during the time interval. This step may include comparing the miss counts for destinations recorded in the miss count table to miss counts of entries in the packet forwarding host table. In step 326, if entries with lower miss counts are present in the host table, control proceeds to step 328 where lower miss count entries in the host table are replaced with higher miss count entries. Again, replacement may be performed for destinations whose miss counts exceed a predetermined threshold. Control then proceeds to step 330 where host table update controller 222 waits for a predetermined time period before returning to step 300 illustrated in FIG. 3A. In step 326, if entries with lower miss counts are not present in the host table, control proceeds to step 332 where the host table is not updated. Control then proceeds to step 330 or host table update controller 222 waits for a predetermined time period and returns to step 300 to repeat the process.

Although in the example illustrated in FIG. 3B, miss counts are stored for each entry present in the host table. In an alternate implementation, usage counts, indicating how many times an entry has been used, may be stored and updated for each host table entry. The usage counts may be compared with miss counts to determine whether or not to replace host table entries. In one exemplary implementation, the usage counts may be maintained by packet forwarding hardware 206 illustrated in FIG. 2 such that each I/O module contains a real time or near real time count of its host table entry usage. In such an implementation, host table update controller 222 may include a component that exists in packet forwarding hardware 206 to maintain the usage counts and a component that executes on the switch management module or on the individual I/O modules to maintain miss counts, compare the miss counts to the usage counts, and replace entries in the host table with entries according to the miss counts if the miss counts exceed the usage counts and a threshold number of miss counts.

It will be understood that various details of the invention may be changed without departing from the scope of the invention. Furthermore, the foregoing description is for the purpose of illustration only, and not for the purpose of limitation.

What is claimed is:

1. A method for controlling updating of a layer 3 host table in a packet forwarding device based on packet forwarding lookup miss counts, the method comprising:

(a) routing layer 3 packets received at a packet forwarding device using a layer 3 host table containing entries corresponding to remote hosts;

(b) for each layer 3 destination address for which a lookup in the layer 3 host table fails because the layer 3 host table lacks an entry for the layer 3 destination address:

counting by the packet forwarding device a number of packets received for the destination address within a time period;

maintaining a packet miss count table with entries for the layer 3 destination addresses for which the misses occurred and that are not in the host table, where the entries in the miss count table include the corresponding miss counts;

determining whether an entry is present for the layer 3 destination address in the packet miss count table;

in response to determining that an entry for the layer 3 destination address is not present in the packet miss count table, adding an entry for layer 3 destination address to the packet miss count table;

in response to determining that an entry is present for the layer 3 destination address in the packet miss count table, incrementing a packet miss counter for the entry; and (c) replacing remote destination entries in the host table based on the miss counts by the packet forwarding device determining which of the entries in the miss count table should be used to replace entries in the host table based on the miss counts.

2. The method of claim 1 wherein routing layer 3 packets using a layer 3 host table includes routing layer 3 packets using a layer 3 host table implemented in hardware.

3. The method of claim 1 wherein routing layer 3 packets using a layer 3 host table includes performing a lookup in the layer 3 host table using a destination IP address extracted from each packet and determining packet forwarding information based on the lookup.

4. The method of claim 1 wherein routing layer 3 packets using a layer 3 host table performing a first lookup in the layer 3 host table, and, in response to failing to locate a matching entry in the layer 3 host table, performing a second lookup in a longest prefix matching (LPM) table.

5. The method of claim 1 comprising determining whether the host table has space available for entries corresponding to remote layer 3 hosts, and wherein performing step (c) includes replacing remote destination entries in the host table based on the counts in response to the determination that the host table does not have space available for entries corresponding to remote layer 3 hosts.

6. The method of claim 1 wherein replacing the remote destination entries in the host table based on the counts includes comparing counts associated with the packets for which the lookup failed with counts corresponding to entries in the layer 3 host table and replacing an entry in the layer 3 host table with an entry in a packet miss count table for which a layer 3 destination address lookup fails in response to determining that the count for the entry in the host table is less than or equal to the count for the entry in the packet miss count table.

7. The method of claim 1 comprising storing counts with the entries in the layer 3 host table.

8. The method of claim 7 comprising updating the counts associated with the entries in the host table in response to receiving packets that match the entries.

9. The method of claim 1 wherein replacing remote destination entries includes determining an age associated with each entry and replacing the entry in response to determining that the age meets or exceeds a threshold value.

10. The method of claim 1 wherein replacing the remote destination entries based on the counts includes replacing the remote destination entries with entries for destinations having miss counts that meet or exceed a threshold.

11. A system for controlling updating of a layer 3 host table in a layer 3 packet forwarding device based on packet forwarding lookup miss counts, the system comprising:
(a) a layer 3 host table including entries corresponding to remote hosts;
(b) a packet forwarding engine hardware for receiving layer 3 packets and for performing lookups in the layer 3 host table and routing the packets based on results of the lookups; and
(c) a host table update controller configured to:
count, for each layer 3 destination address for which a lookup in the host table fails because the host table lacks an entry corresponding to the layer 3 destination address, a number of packets received within a time period;
maintain a packet miss count table with entries for the layer 3 destination addresses for which the misses occurred and that are not in the host table, where the entries in the miss count table include the corresponding miss counts;
determine whether an entry for a destination of the packet exists in the packet miss count table, and in response to determining that entry does not exist, create an entry corresponding to the destination, and in response to determining that an entry exists for the destination in the packet miss count table, increment a packet miss count for the entry; and
replace remote destination address entries in the host table based on the miss counts by determining which of the entries in the miss count table should be used to replace entries in the host table based on the miss counts.

12. The system of claim 11 wherein the host table is implemented in hardware.

13. The system of claim 11 wherein each entry in the host table includes an Internet protocol (IP) address and corresponding packet forwarding information.

14. The system of claim 11 comprising a longest prefix matching (LPM) table, wherein the packet forwarding engine performs a lookup in the host table, and, in response to failing to locate a matching entry in the host table, the packet forwarding engine performs a lookup in the LPM table.

15. The system of claim 11 wherein the host table update controller replaces remote destination entries in the host table in response to determining that the host table does not have space available for additional remote host entries.

16. The system of claim 11 wherein the host table update controller compares counts associated with the destinations for which lookups failed with counts stored with entries in the host table and to replace entries in the host table in response to determining that the counts associated with the destinations for which the lookup fails are greater than or equal to counts associated with entries in the host table.

17. The system of claim 11 wherein the host table update controller maintains a usage count for each entry in the host table.

18. The system of claim 17 wherein the host table update controller updates the usage count for each entry in response to receiving a packet corresponding to the entry.

19. The system of claim 18 wherein the host table update controller replaces entries in the host table using the usage counts and the counts for which the lookups failed.

20. The system of claim 11 wherein the host table update controller replaces remote destination entries in the host table in response to the entries being present in the table for a predetermined time period.

21. The system of claim 11 wherein the host table update controller replaces remote destination entries in the host table with entries for destinations having packet miss counts that meet or exceed a threshold value.

22. A computer program product comprising computer-executable instructions embodied in a computer-readable non-transitory medium for performing steps comprising:
(a) routing layer 3 packets received at a packet forwarding device using a layer 3 host table containing entries corresponding to remote hosts;
(b) for each layer 3 destination address for which a lookup in the layer 3 host table fails:
counting by the packet forwarding device a number of packets received for the layer 3 destination address within a time period because the host table lacks entries corresponding to the layer 3 destination address;
maintaining a packet miss count table with entries for the layer 3 destination addresses for which the misses occurred and that are not in the host table, where the entries in the miss count table include the corresponding miss counts;
determining whether an entry is present for the layer 3 destination address in the packet miss count table;
in response to determining that an entry for the layer 3 destination address is not present in the packet miss count table, adding an entry for layer 3 destination address to the packet miss count table;
in response to determining that an entry is present for the layer 3 destination address in the packet miss count table, incrementing a packet miss counter for the entry; and
(c) replacing remote destination entries in the host table based on the miss counts by the packet forwarding device determining which of the entries in the miss count table should be used to replace entries in the host table based on the miss counts.

* * * * *